(12) United States Patent
Kaipainen et al.

(10) Patent No.: US 7,395,032 B2
(45) Date of Patent: Jul. 1, 2008

(54) TRANSMISSIONS FROM A STATION WITH MULTIPLE ANTENNAE

(75) Inventors: Yrjö Kaipainen, Espoo (FI); Markku Kuusela, Helsinki (FI)

(73) Assignee: Nokia Corporation, Espoo (FI)

( * ) Notice: Subject to any disclaimer, the term of this patent is extended or adjusted under 35 U.S.C. 154(b) by 565 days.

(21) Appl. No.: 10/683,348

(22) Filed: Oct. 14, 2003

(65) Prior Publication Data
US 2004/0235526 A1   Nov. 25, 2004

(30) Foreign Application Priority Data
May 22, 2003   (GB)   .................... 0311856.9

(51) Int. Cl.
*H03C 7/02* (2006.01)
*H04B 1/02* (2006.01)
(52) U.S. Cl. ............... 455/101; 455/522; 455/562.1
(58) Field of Classification Search ............ 455/56.1, 455/101, 522, 103, 127.1, 127.2, 69, 116, 455/272, 562.1, 67.11, 561; 375/299, 267, 375/312, 146; 370/335, 342, 334
See application file for complete search history.

(56) References Cited

U.S. PATENT DOCUMENTS

| | | | |
|---|---|---|---|
| 6,611,675 B1 * | 8/2003 | Salonen et al. | ............... 455/69 |
| 6,754,473 B1 * | 6/2004 | Choi et al. | ................. 455/101 |
| 2002/0075970 A1 * | 6/2002 | Ohhashi | ..................... 375/299 |
| 2002/0105961 A1 * | 8/2002 | Hottinen et al. | ............. 370/342 |
| 2002/0131381 A1 * | 9/2002 | Kim et al. | ..................... 370/335 |
| 2003/0022634 A1 * | 1/2003 | Benning et al. | ............. 455/101 |
| 2003/0099216 A1 * | 5/2003 | Nilsson et al. | ............. 370/335 |
| 2003/0099306 A1 * | 5/2003 | Nilsson et al. | ............. 375/316 |
| 2003/0148770 A1 * | 8/2003 | Das et al. | .................... 455/561 |
| 2004/0160921 A1 * | 8/2004 | Kaipainen et al. | ........... 370/335 |
| 2005/0260954 A1 * | 11/2005 | Hamalainen et al. | ........ 455/101 |
| 2006/0148415 A1 * | 7/2006 | Hamalainen et al. | .......... 455/69 |

OTHER PUBLICATIONS

"3rd Generation Partnership Project; Technical Specification Group Radio Access Network; Physical Layer Procedures (FDD)," 3GPP Organizational Partners (ARIB, CWTS, ETSI, TI, TTA, TTC); 2002.
3GPP TSG RAN WG1#27, Agenda Item: Ad Hoc: Tx Diversity, "TxAA for HSDPA—Some Link Simulation Results," Nokia, Jul. 2-5, 2002.

* cited by examiner

*Primary Examiner*—Quochien B. Vuong
(74) *Attorney, Agent, or Firm*—Squire, Sanders & Dempsey L.L.P.

(57) ABSTRACT

A method for transmitting from a multi-antenna station and a multi-antenna station is provided. The station is provided with a reference antenna and a diversity antenna. During the operation of the method, one of the antennae is selected to be stronger in the event of power unbalance between the diversity and reference antennae. Greater transmission power is assigned for the diversity antenna than the reference antenna when the diversity antenna is only phase adjusted. Greater transmission power is assigned for the reference antenna than the diversity antenna when the reference antenna is amplitude adjusted.

7 Claims, 4 Drawing Sheets

TRANSMISSIONS FROM A STATION WITH MULTIPLE ANTENNAE

BACKGROUND OF THE INVENTION

1. Field of the Invention

The invention relates to transmission from a station provided with multiple antennae. The station may be, for example, a base station of a cellular communication system.

2. Description of the Related Art

Multi-antenna transmission and/or reception can be used in a communication system providing wireless communications between stations. Communication systems adapted to provide wireless communication for mobile users are well known. The wireless communication media can be provided between a base station of a communication network and a user equipment. A mobile user equipment is often referenced to by the term mobile station. Wireless communication may also be provided between two user equipment, between two stations of a communication network or between a satellite based station and another station.

A wireless communication system can be used for various types of communication, such as for voice communication or data communication. A wireless system may provide circuit switched or packet switched services or both. In packet switched services data (e.g. speech data, user data, video data or other data) is communicated in data packets. The development in the wireless communication has lead to systems that are capable of transporting data in substantially high data rates i.e. the so called high speed data (HSD).

In a cellular system the mobile user equipment may access the communication network via access entities referred to as cells, hence the name cellular system. One skilled in the art knows the basic operational principles and elements of a cellular network and these are therefore not explained herein in any greater detail. It is sufficient to note that a cell can be defined as an radio access entity that is served by one or several base stations (BS) serving mobile station user equipment (UE) via a wireless interface therebetween. Examples of the cellular networks include networks that are based on access systems such as the CDMA (Code Division Multiple Access), WCDMA (Wide-band CDMA), TDMA (Time Division Multiple Access), FDMA (Frequency Division Multiple Access), or SDMA (Space Division Multiple Access) and hybrids thereof.

A mobile user equipment (UE) may communicate simultaneously with a plurality of antenna branches of a base station. FIG. 1 shows an example where a user equipment 1 is receiving signals from two antenna branches 3, 4 of a base station 2. This type of transmission arrangements are sometimes referred to as tx diversity.

The mobile user equipment and the base may transmit to each other data such as control messages, user data and so on. The messages may, for example, be feedback messages. The feedback messages may relate to the tx diversity. The following will discuss a more detailed example that relates to a third generation wideband code division multiple access (3G WCDMA) system.

In WCDMA based systems the above referred high speed data may be enabled e.g. by means of the so called high speed downlink packet access (HSDPA) technology. At the present it is assumed that in the high speed downlink packet access (HSDPA) each user equipment receiving data on a high speed downlink shared channel (HS-DSCH) also has an associated dedicated channel (DCH) allocated. The dedicated channel may be mapped to a dedicated physical channel (DPCH). The DPCH is typically divided into dedicated physical data channel (DPDCH) and dedicated physical control channel (DPCCH) both in the uplink and the downlink. Data such as the power control commands, transport format information, and dedicated pilot symbols are transmitted on the DPCCH. Information such as diversity feedback information may be transmitted on DPCCH in the uplink. It shall be appreciated that although the HSDPA has been specified for use in the WCDMA, similar basic principles may be applied to other access techniques.

Use of the so called closed loop transmit diversity modes have been defined e.g. in the Third Generation Partnership Project (3GPP) technical specification 25.214 version 5.2.0 which was released on Sep. 2002 and titled 'Group Radio Access Network; Physical layer procedures (FDD) (Release 5)'. A specific reference is made herein to paragraph 7 'Closed loop mode transmit diversity' on pages 43 to 51 of this document wherein two different closed loop modes are proposed. These modes are referenced to in the specification as 'closed loop Mode 1' and 'closed loop Mode 2'.

The general principles of closed loop mode transmit diversity for DPCH transmission can be seen from FIG. 1. Channel coding, interleaving and spreading may be done in a per se known manner, e.g. as in non-diversity mode. As the skilled person is familiar with these operations and they are not essential for the understanding of the invention, they are not described in any greater detail.

In the transmission from the base station 2, a spread complex valued signal is fed to both transmission antenna branches 3 and 4 of the base station 2. The signals are weighted with antenna specific weight factors $w_1$ and $w_2$ at multipliers 7 and 8. The weight factors can be described briefly as being the corresponding phase adjustments in the closed loop mode 1 and phase and amplitude adjustments in closed loop mode 2. These factors are determined by the user equipment 1, and may be signalled to the base station 2 on the uplink DPCCH. Typically the weight factors would be complex valued signals (i.e., $$w_i = a_i + j b_i).$$

For the closed loop mode 1 different orthogonal dedicated pilot symbols are sent on the 2 different antennae 3 and 4. For closed loop mode 2 the same dedicated pilot symbols are sent on both antennae. The transmissions may occur on the DPCCH.

The mobile user equipment 1 may choose from a closed loop mode specific set of transmission weights complex weight factors $w_1$ and $w_2$. The weight factors are typically chosen such that they should maximize the received power at the mobile user equipment. The power can be written $$P = w^H H^H H w,$$

where $$w = \begin{bmatrix} w_1 \\ w_2 \end{bmatrix}$$

is the weight vector, $$H = \begin{bmatrix} h_1 & h_2 \end{bmatrix} = \begin{bmatrix} h_{1,1} & h_{2,1} \\ \vdots & \vdots \\ h_{1,L} & h_{2,L} \end{bmatrix}$$

is the channel matrix, $h_{i,j}$ is the jth multipath component of the channel between transmission (tx) antenna i∈[1,2] and the mobile user equipment, and L is the number of multipath components.

The mobile user equipment 1 then feeds back to the base station 2 the selected complex weight factors. This may occur on the uplink (UL) dedicated physical control channel (DPCCH).

At the base station 2 the same complex valued signal is then fed to both transmitting antenna branches 3 and 4. The antennae are then weighted with antenna specific weight factors $w_1$ and $w_2$. One of the transmission antennae is weighted by the so called real weight factor $w_1$. This means that the antenna is not rotated from the phase thereof, i.e. the antenna is not phase adjusted. Such an antenna, which is not phase adjusted, will be called in this specification as the reference antenna.

The other antenna is weighted by the weight factor $w_2$. This antenna is phase adjusted as the phase thereof is rotated. Such a phase adjusted antenna will be referenced to in this specification as the diversity antenna.

Introduction of these modes has proven to improve downlink performance in the multi-antenna arrangements. A reason for the improvement is utilization of the feedback information at the base station. As explained above, the feedback information is determined by the mobile user equipment i.e. the mobile station (MS) based on signals it receives from the base station (BS). Therefore the feedback information should, in theory, reflect accurately the manner the mobile user equipment receives from the base station.

However, use of the feedback makes the closed loop modes sensitive to non-idealities that are likely to occur in real life implementations. For example, both closed loop modes may suffer from non-idealities such as feedback errors, feedback delay, multi-path propagation and so on.

Various antenna verification algorithms may be used to minimize the performance loss caused by feedback errors. In general terms, the antenna verification can be defined as a process by means of which the receiving station may verify that it receives in the requested manner from the transmitting station. One of the basic principles of these verification algorithms is that they try to detect any feedback errors. If an error is detected, an appropriate corrective action may then be taken.

An undetected feedback error may severely degrade the performance of the communication system. As a result of the feedback errors the decoding of the received signals is accomplished by using wrong knowledge of the effective channel at the receiver.

The antenna verification algorithms may utilize dedicated channel estimates. The channel estimates are typically based on dedicated pilot signals transmitted from the base station. In the closed loop mode 1 the dedicated pilots are tx-antenna specific. In closed loop mode 2 the same dedicated pilot is transmitted from both tx-antennas. As the tx-weighting is applied also on the dedicated pilot signals, the dedicated channel estimate(s) contain information regarding the effective channel and the weights used for transmission.

The verification is typically performed based on signals from the diversity antenna.

Antenna verification can be used to mitigate, for example, the following problem. To be able to decode the received signal correctly, the receiver should have the knowledge of the effective channel at the receiver. The dedicated channel estimate contains the information of the used tx-weight. Therefore, if the decoding of the signal is done by using dedicated channel estimates, there is no need to verify the used tx-weights.

The discontinuous DPCH pilot signals are typically transmitted with lower power than continuous primary common pilot channel (CpiCH) signals. Therefore it is considered as more desirable from the system performance point of view to use CpiCH estimates instead of the DPCH estimates. However, when the effective channel is formed by using the CpiCH estimates, information about the used tx-weights should somehow be made available. This is so since the CpiCH signal is not tx-weighted. If the receiving station uses wrong assumption of the effective channel in the decoding (i.e., effective channel is created by using wrong assumption of the used tx-weights), this may result, among other things, bit errors as wrong symbols are detected.

One skilled in the art is familiar with the basic principles of the antenna verification and various possibilities for verifying antennas. For example, a straightforward verification algorithm may be employed wherein a 4-hypothesis test is applied per a slot for the closed loop mode 1. A possibility is to use a simplified beam verification (SBV) that requires only a 2-hypothesis test per slot. For the closed loop mode 2, antenna verification can also be performed, for example using a 16-hypothesis test per slot. As explained above, for closed loop mode 2, the same pilot sequence is transmitted on both antennas for DPCCH. Those interested will find a more detailed description of the above examples from Annex A of the above referenced third generation partnership project (3GPP) specification TS25.214, version 5.2.0 of Sep. 2002.

In the ideal case where the transmission power is equally divided between the antenna branches the choice of the diversity antenna should not have any significant influence to the performance of the closed loop modes. However, non-idealities are likely to be present at the transmitter side. These may cause constant power offset i.e. unbalance between the antenna branches. In such circumstances there may be a need for selection of an appropriate diversity antenna. This may be required especially in order to improve the performance.

SUMMARY OF THE INVENTION

The invention provides a method for transmitting from a multi-antenna station provided with a reference antenna and a diversity antenna. The method includes the step of transmitting, in the event of power unbalance between the diversity and reference antennae, either (a) with greater transmission power from the diversity antenna than the reference antenna, if the diversity antenna is only phase adjusted or (b) with greater transmission power from the reference antenna than the diversity antenna if the reference antenna is amplitude adjusted.

The invention also provides a multi-antenna station for a communication system. The station includes a reference antenna and a diversity antenna. The station is configured to transmit in the event of power unbalance between the diversity and reference antennae either with greater transmission power from the diversity antenna than the reference antenna when the diversity antenna is only phase adjusted or with greater transmission power from the reference antenna than the diversity antenna when the reference antenna is amplitude adjusted.

One of the advantages of the invention is that it may provide a way to improve the performance of diversity transmission, especially the performance of the above described closed loop modes. Improved performance is especially achieved in circumstances wherein there is a possibility for feedback errors and the power levels of the antennae differ from each other.

BRIEF DESCRIPTION OF THE DRAWINGS

For better understanding of the invention, reference will now be made by way of example to the accompanying drawings in which.

DETAILED DESCRIPTION OF THE PREFERRED EMBODIMENTS

Figure 1:
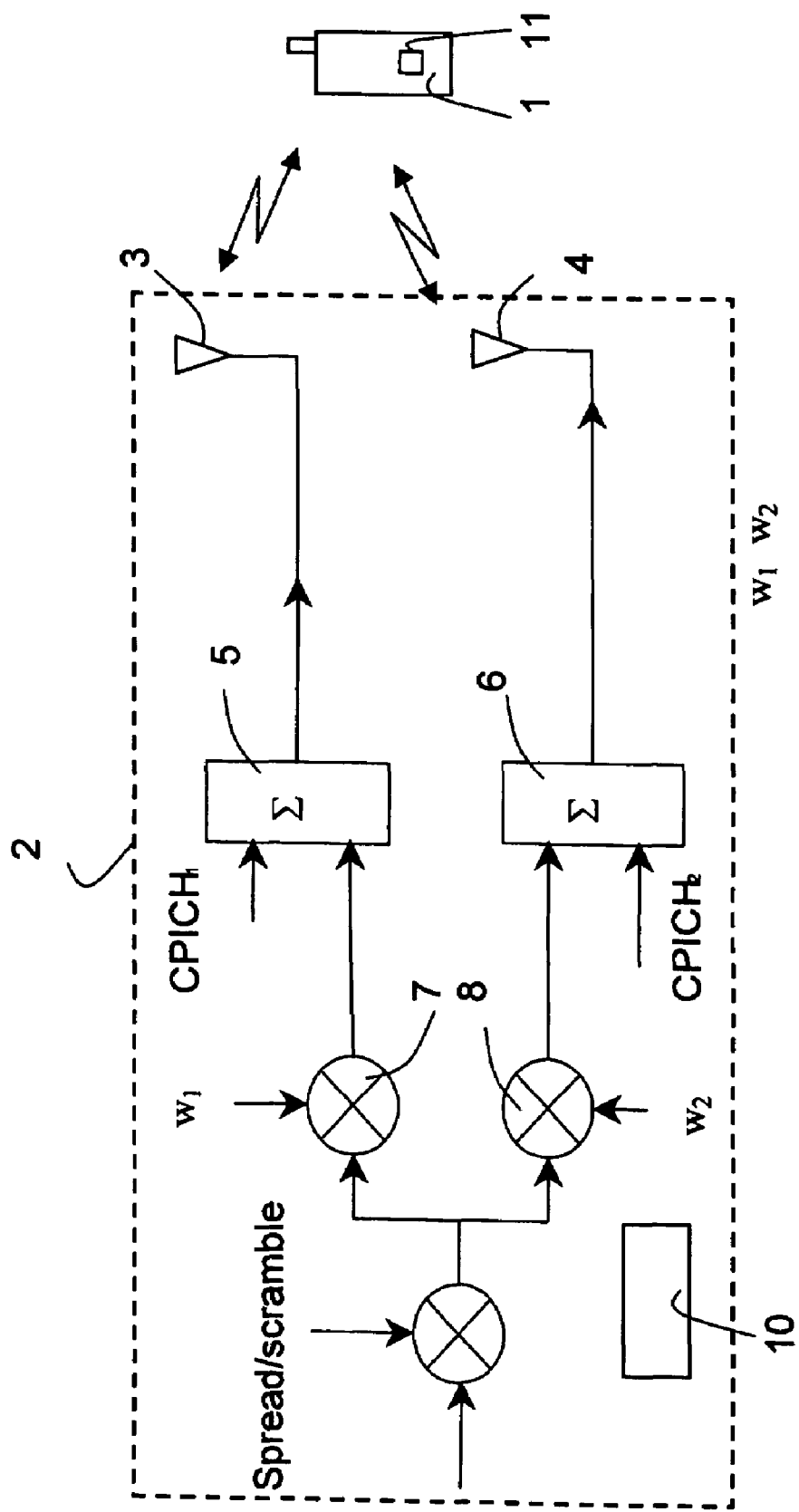
FIG. 1 shows an environment wherein the invention can be embodied.

FIG. 1 is a schematic presentation of a communication system wherein the invention may be embodied. In the shown system a base station 2 of a cellular communication system serves a mobile user equipment 1 that is located within the radio coverage area of the base station. The mobile user equipment is arranged for communication over multiple wireless channels with the base transceiver station 2. More particularly, the mobile user equipment 1 is shown to be in wireless communication with two antennae 3 and 4 of the base station 2.

A feature of the mobile user equipment 1 is that it offers mobility for the user thereof, i.e. may move within the coverage area of the base station (i.e. the cell) also from a cell to another cell. Thus the mobile user equipment 1 will be referenced to in the following by the term mobile station.

One skilled in the art is familiar with the basic features and operation of a mobile station and a base station serving the mobile station, and therefore these are not described herein in more detail. It is sufficient to note that the mobile station 1 and the base station 2 are provided with antenna means that are arranged for communication via multiple channels. The base station 2 and mobile station 1 are also provided with respective control entities 10 and 11. The controller entities are for provision of various data processing and control functions required for the communication between the two stations. Since the appropriate controllers for the base station and mobile station are well known by the skilled person, these are not explained in detail.

FIG. 1 shows the general principles of closed loop mode transmit diversity for DPCH transmission. It shall be appreciated that similar principles may apply to other transmission applications, such as the HS-DSCH. The base station 2 transmits common pilot signals on the CpiCH. Upon reception of the common pilots the mobile station 1 may then choose from a closed loop mode specific set of transmission weights complex weight factors $w_1$ and $w_2$. The selection of the weight parameters $w_1$ and $w_2$ as such is not an essential feature of the invention, and will thus not be explained in any greater detail. It is sufficient to note that the weight factors are typically chosen such that they maximize the received power at the mobile station.

The selected complex weight factors $w_1$ and $w_2$ are then signalled from the mobile station 1 to the base station 2 on uplink DPCCH. At the base station the same complex valued signal is fed to both transmitting antenna branches 5 and 6 at multipliers 7 and 8. The antennae 3 and 4 are thus weighted with antenna specific weight factors $w_1$ and $w_2$.

The transmission antennae 3 is typically weighted by the so called real weight factor $w_1$. This means that the antenna 3 is not rotated from the phase thereof, i.e. not phase adjusted. Thus this antenna is caked here as the reference antenna. The second antenna 4 is weighted by the factor $w_2$. This antenna is phase adjusted i.e. the phase thereof is rotated. This antenna is called here as the diversity antenna.

The base station 2 may be adapted to perform other per se known operations, such as spreading and scrambling. The channel coding and interleaving operations may be done in a per se known manner, e.g. as in non-diversity mode. The other possible functions of the base station are not essential in understanding the invention, and are therefore 2 not described in more detail.

The first and second embodiments relate to the closed loop mode 1. The closed loop mode 1 embodiments will be described in more detail with reference to the flowcharts of FIGS. 2 and 3. These embodiments are based on the discovery that the efficiency of closed loop mode 1 transmissions can be improved by assigning greater transmission powers for the diversity antenna.

The closed loop mode 1 two orthogonal dedicated pilot patterns are sent, one for each dedicated channel. Thus the receiving station (i.e. the mobile station 1 in FIG. 1) is able to produce a channel estimate for both of the dedicated channels. As described above, the dedicated channel of the diversity antenna is phase weighted. Thus the corresponding dedicated channel estimate can be used in the closed loop mode 1 verification where the dedicated channel estimate of the diversity antenna is needed. The verification does not need information regarding the channel estimate for the reference antenna.

As also mentioned above, in mode 1 it is possible to produce a separate channel estimate for the diversity antenna since each antenna has its own dedicated pilot sequence. As the dedicated channel estimate of diversity antenna contains the needed information regarding the used tx-weight, the quality of the dedicated channel estimate of the diversity antenna is important in ensuring proper operation of the verification algorithm.

In a typical arrangement the power unbalance caused by the non-idealities at the transmitter side is expected to be no more than 4 dB between the two antennae in closed loop mode 1. From the maximum power un-balance 2 dB may be caused by each branch.

By means of suitably chosen diversity antenna in the power unbalance situation is possible to improve the quality of the dedicated channel estimate of the diversity antenna. The quality of the channel estimate refers to the amount of energy that can be collected from dedicated channel estimates. The quality can be improved by selecting the stronger antenna to be the diversity antenna.

Figure 2:
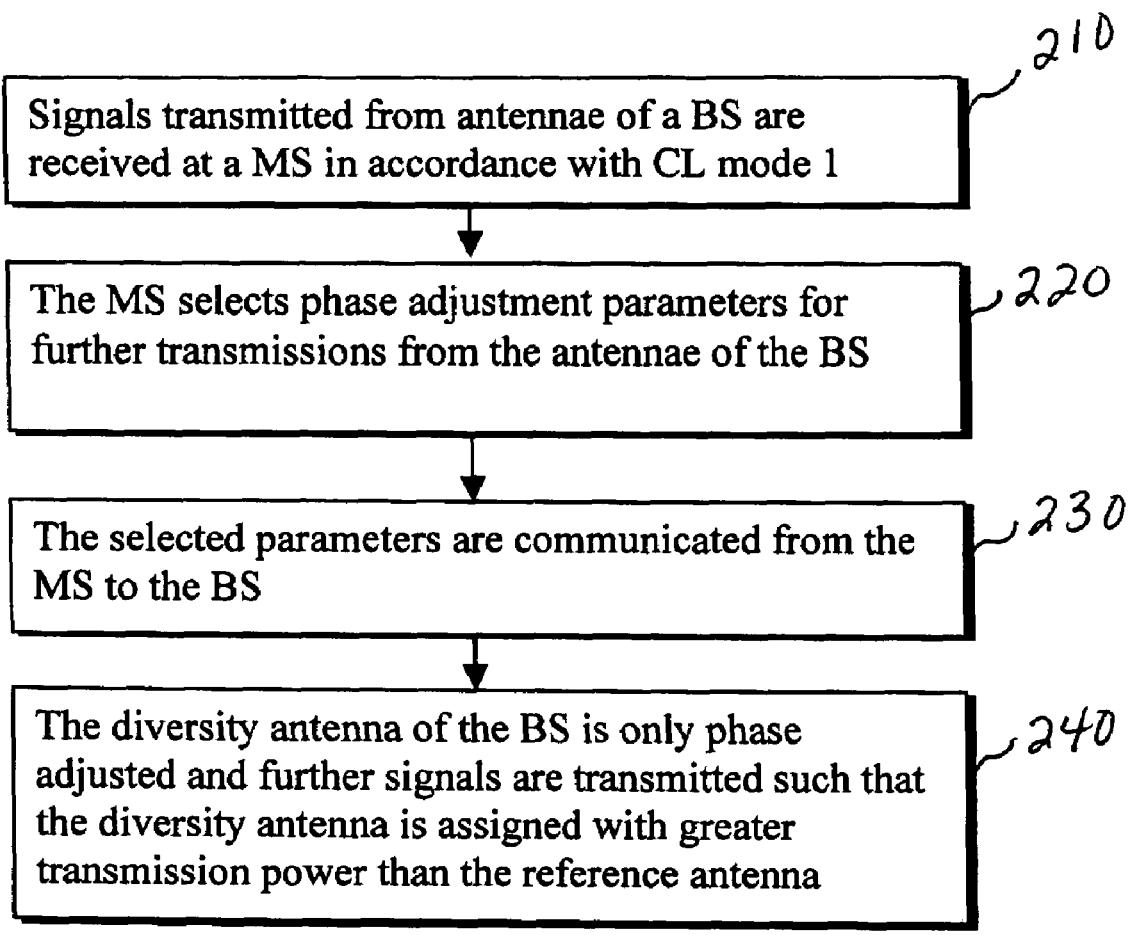
FIG. 2 is a flowchart illustrating the operation of one embodiment of the invention.

According to one embodiment of the closed loop mode 1 as illustrated in FIG. 2, signals transmitted from the antennae of a base station are received at a mobile station in accordance with the closed loop mode 1 (Step 210). In Step 220, the mobile station selects the phase adjustment parameters for further transmission from the antennae of the base station. The selected parameters are communicated from the mobile station to the base station in Step 230. The diversity antenna of the base station, in Step 240, is only phase adjusted and further signals are transmitted such that the diversity antenna is assigned with greater transmission power than the reference antenna.

Figure 3:
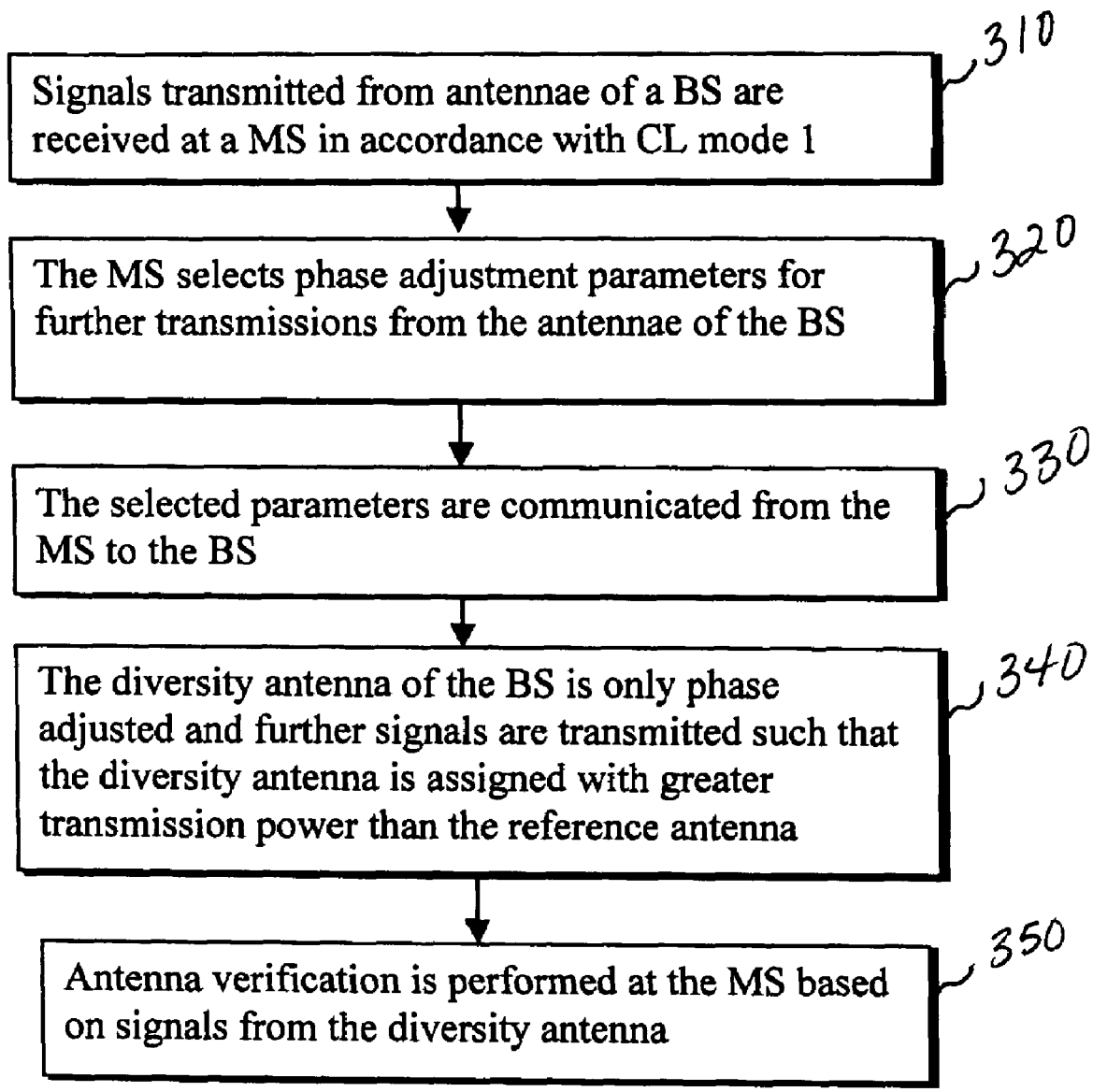
FIG. 3 is a flowchart illustrating a further embodiment of the operation of the invention.

As a result of this improvement, the performance of the antenna verification may also be improved in the embodiment shown in FIG. 3.

In the embodiment illustrated in FIG. 3, signals transmitted from the antennae of a base station in Step 310 are received at a mobile station in accordance with the closed loop mode 1. In Step 320, the mobile station selects the phase adjustment parameters for further transmissions from the antennae of the base station. In Step 330, the selected parameters are communicated from the mobile station to the base station. In Step 340, the diversity antenna of the base station is only phase adjusted and further signals are transmitted such that the diversity antenna is assigned with greater transmission power than the reference antenna. In Step 350, the antenna verification is performed at the mobile station based on signals from the diversity antenna.

Thus it is advantageous if more power is used for transmission of the dedicated pilot sequence via the diversity antenna. This will improve the quality of the pilot signal of the diversity antenna. In FIG. 1 greater transmission power is assigned to the phase adjusted diversity antenna 4.

On the other hand, when the diversity antenna i.e. the phase rotated antenna is selected to be the stronger antenna, this may increase the negative effect of undetected feedback errors to the system performance. This may be caused by the fact that more power is transmitted on the phase rotated channel. However, this is not believed to cause any significant disadvantage to the system performance since the selection of the diversity antenna improves at the same time the performance of the verification algorithm. The existing antenna verification processes for the close loop mode 1 are already fairly good and able to correct most of the errors which occur in the feedback channel. Therefore it is not as likely as it is in close loop mode 2 that feedback errors would go undetected when operating in accordance with the closed loop mode 1.

Thus, when considering the overall operation in accordance with the closed loop mode 1, the advantage obtained through the improved performance of the verification algorithm is considered to be greater than the disadvantage of increased risk for feedback errors. Thus the diversity antenna should be selected for closed loop mode 1 such that the selected antenna improves the functionality of the verification process. In other words, maximization of the performance of the closed loop mode 1 in the power unbalance situation should be done by improving the capability of correcting errors of the antenna verification algorithm. This may be done by giving a bigger portion of the transmission power to the diversity antenna. This may improve the reliability of the dedicated channel estimate done based on the transmission from the adjusted antenna. This will improve the quality of the channel estimate, and thus reduce the risk of using wrong weight in decoding of subsequent transmissions.

The second embodiment of the invention will now be described with reference to the closed loop mode 2 and FIG. 4.

The closed loop mode 2 uses amplitude weighting such that the reference antenna is only amplitude adjusted while the diversity antenna is both amplitude and phase adjusted. The weight is set at the transmitting station based on the feedback from the receiving station.

In the close loop mode 2 both transmission antennas share the same dedicated pilot sequence. Thus the receiving mobile station 1 is not able to separately estimate both of the dedicated channels of the antenna branches. Instead, only one dedicated channels estimate can be produced. In other words, this one channel estimate is a sum $$H_d = w_1 h_1 + w_2 h_2$$

wherein $w_1$ and $w_2$ represent the weight factors and $h_1$ and $h_2$ represent the channel matrix, discussed above.

Thus it is not possible to select one of the antennae for the channel estimation, as was explained above in the context of the closed mode 1. Since the dedicated channel estimate is a sum of the two channels, it is not possible to influence the value of the amplitude of the channel estimate and the quality thereof by selecting the diversity antenna to be the stronger antenna in instances wherein the powers of the two antennae are unbalanced. This is so since the choice of the diversity antenna does not affect the average reliability of the combined channel estimate. As a consequence of this it does not affect the error correcting capability of the antenna verification algorithm. If the diversity antenna is chosen to be the stronger antenna, as can be advantageously done in the closed loop mode 1, the negative effect of undetected feedback errors to the system error may increase. Because of the amplitude weighting, this effect may be much greater in the closed loop mode 2 than the 4 dB in the closed loop mode 1. The unbalance can be in the order of 10 dB. This is caused by the power ratio between amplitude weights which is 6 dB in mode 2 and the non-idealities at the transmitter. As explained above, the non-idealities may cause the other antenna being 4 dB stronger in the transmission power than the other of the two antennae. In a typical operation it is likely that the greater amplitude weight is used for this 4 dB stronger antenna. This, in turn, will result in a difference of about 10 dB.

Therefore better results in the overall performance can be obtained if the effect of possible feedback errors could be reduced and it is more important to ensure that the feedback errors effect as little as possible the overall performance in the closed loop mode 2. This so since it is not possible to influence the error correcting capability of the closed loop mode 2 verification by the choice of the diversity antenna. Instead, the performance of the close loop mode 2, if the transmission powers are unbalanced between the antenna branches, may be improved by always giving a greater portion of the transmission power to the reference antenna, that is to the non-phase adjusted antenna. Since the non-rotated channel provided by the reference antenna is on average on a 10 dB higher power level the effect of an undetected feedback error is not as serious as it would have been if a greater portion of the transmission power would have been given to the diversity antenna.

The selection of the antenna may be fixed. The selection can be set when configuring and/or set-up of the base station based on information regarding the closed loop mode to be used. The power unbalance may be measured at the time of setting up the base station, for example by means of field measurements. The common pilots may then be attached to the reference and diversity antennae as explained above. A base station would normally be configured to operate in accordance with the closed loop mode 1 or the closed loop mode 2. Therefore the selection of the antenna can be made in accordance with the selected mode without any need to consider the effects this might have if the other mode would be used. It shall be appreciated that the setting may be changed later on, should this become necessary.

Figure 4:
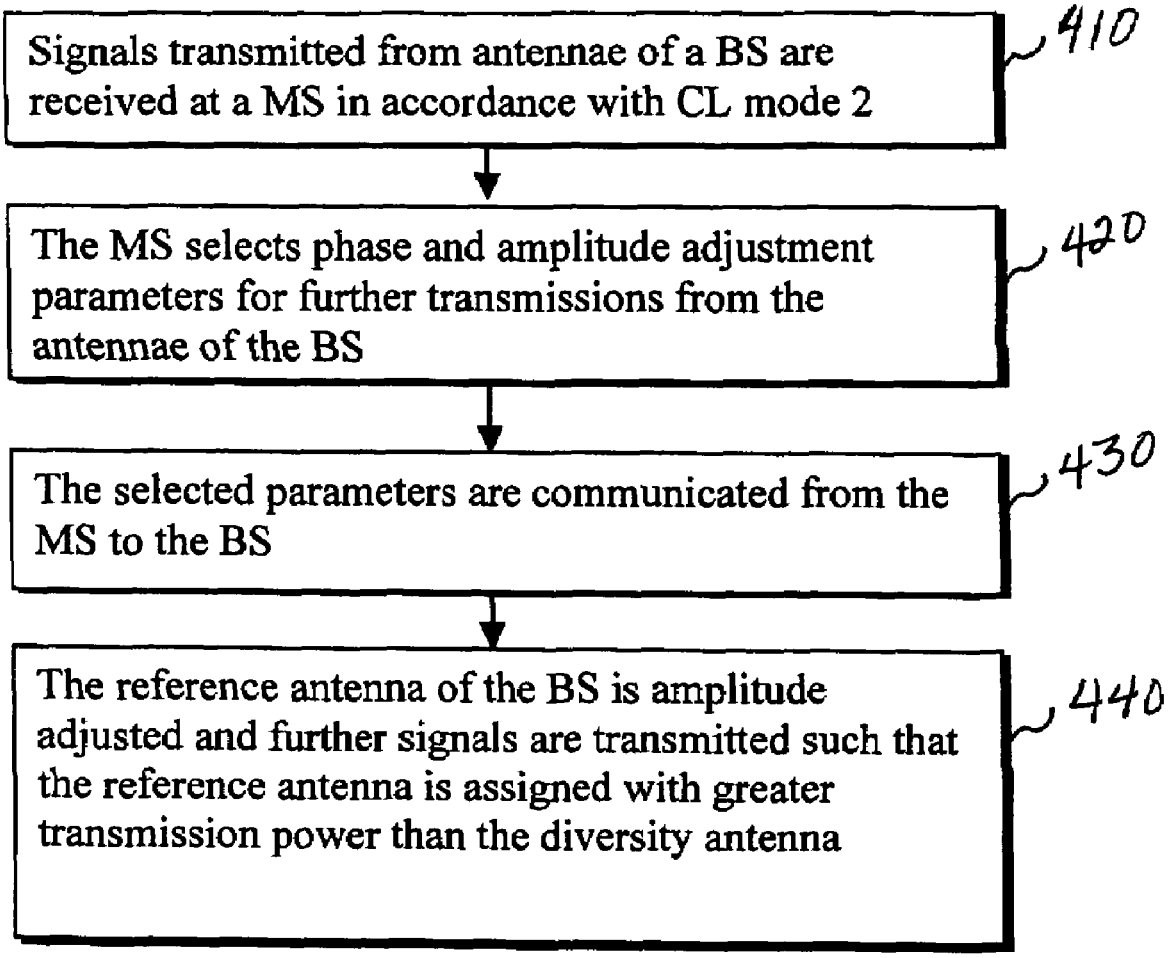
FIG. 4 is a flowchart illustrating the operation of yet another embodiment of the invention

According to the embodiment of the closed loop mode 2 as shown in FIG. 4, signals transmitted from antennae of a base station are received at a mobile station in accordance with the closed loop mode 2 in Step 410. In Step 420, the mobile station selects phase and amplitude adjustment parameters for further transmission from the antennae of the base station. In Step 430, the selected parameters are communicated from the mobile station to the base station. In Step 440, the reference antenna of the base station is amplitude adjusted and further signals are transmitted such that the reference antenna is assigned with greater transmission power than the diversity antenna.

The above described verification process has been tested by simulations in the HSDPA environment. The simulation results have indicated that the above conclusions regarding selection of an antenna branch for transmission in greater power than in the other branch in the close loop modes 1 and 2 are right.

It is noted that the above disclosed solution is applicable in case of any multi-antenna arrangement wherein similar conditions apply.

It should be appreciated that whilst embodiments of the invention have been described in relation to base stations and user equipment such as mobile stations, embodiments of the invention are applicable to any other suitable type of stations. The receiving station may also receive via a plurality of antennae.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
    transmitting, when a power unbalance between a diversity antenna and a reference antenna occurs, with greater transmission power from the diversity antenna than the reference antenna; and
    adjusting the diversity antenna using phase adjustments, wherein
    the method is used for transmitting from a multi-antenna station provided with the reference antenna and the diversity antenna.

2. The method of claim 1, wherein transmitting comprises transmitting from the station comprising a base station of a mobile communication system.

3. The method of claim 1, further comprising communicating, via the station, in accordance with a closed loop mode one as defined by a third generation partnership project.

4. The method as claimed in claim 1, further comprising:
    transmitting signal sequence via the diversity antennae;
    receiving the signal sequence at a receiving station;
    receiving a pilot signal sequence at a second station; and
    performing antenna verification at the receiving station based on a dedicated channel estimate obtained based on the signal sequence from the diversity antenna.

5. A multi-antenna station for a communication system, the station comprising:
    a reference antenna and a diversity antenna; and
    a station being configured to transmit, when a power unbalance between the diversity and reference antennae occurs, and when the diversity antenna is phase adjusted, with greater transmission power from the diversity antenna than the reference antenna.

6. A system, comprising:
    a transmitting means for transmitting, when a power unbalance between the diversity and reference antennae occurs, with greater transmission power from the diversity antenna than the reference antenna; and
    an adjusting means for adjusting the diversity antenna using phase adjustments, wherein
    the system is used for transmitting from a multi-antenna station provided with a reference antenna and a diversity antenna.

7. A multi-antenna station for a communication system, the multi-antenna station comprising:
    transmitting means for transmitting, when a power unbalance between a diversity and reference antennae occurs, with greater transmission power from a diversity antenna than the reference antenna; and
    adjusting means for adjusting the diversity antenna using phase adjustments.

* * * * *